United States Patent
Carriere et al.

(10) Patent No.: US 6,814,686 B2
(45) Date of Patent: Nov. 9, 2004

(54) DUAL ENGINE CRANKSHAFT COUPLING ARRANGEMENT

(75) Inventors: Donald L Carriere, Livonia, MI (US); Thomas L Kizer, Farmington Hills, MI (US); Jeffrey P Cherry, Livonia, MI (US); George Konstantakopoulos, Birmingham, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/339,207

(22) Filed: Jan. 9, 2003

(65) Prior Publication Data

US 2004/0138026 A1 Jul. 15, 2004

(51) Int. Cl.$^7$ ................................................ B60K 41/02
(52) U.S. Cl. ............................................ 477/6; 74/661
(58) Field of Search .......................... 477/2, 6; 74/661; 192/53.1, 53.5, 48.3, 48.5, 93 C (56) References Cited

U.S. PATENT DOCUMENTS

| | | | | |
|---|---|---|---|---|
| 3,370,484 A | * | 2/1968 | Lovercheck | ................ 74/661 |
| 4,069,803 A | * | 1/1978 | Cataldo | ................ 123/198 F |
| 4,421,217 A | * | 12/1983 | Vagias | ................ 477/6 |
| 4,662,490 A | * | 5/1987 | Yamakawa | ................ 477/6 |
| 4,951,467 A | | 8/1990 | Walsh et al. | |
| 5,492,189 A | | 2/1996 | Kriegler et al. | |
| 6,306,056 B1 | | 10/2001 | Moore | |

* cited by examiner

*Primary Examiner*—Dirk Wright
(74) *Attorney, Agent, or Firm*—Thomas A. Jurecko (57) ABSTRACT

A dual engine crankshaft coupling arrangement is provided. The coupling arrangement includes a starter clutch portion for frictionally engaging a crankshaft of a primary engine with a crankshaft of a secondary engine for starting the second engine. A phase clutch is also provided for engaging the first and second crankshafts in an angular specific relative orientation for proper timing relationships coupling of the engine crankshafts.

12 Claims, 9 Drawing Sheets

DUAL ENGINE CRANKSHAFT COUPLING ARRANGEMENT

FIELD OF THE INVENTION

The present invention relates to a power unit for a vehicle and more particularly, a dual engine crankshaft coupling arrangement.

BACKGROUND OF THE INVENTION

Internal combustion engines have been used for many years for providing motive power for driving a vehicle. Most vehicles on the road today are provided with either a four, six, or eight cylinder engine which is selected based upon the typical torque demand requirements for the individual type vehicle being designed. For example, four cylinder engines are typically used for commuter vehicles which are compact and typically have low load requirements and limited performance expectations. Six cylinder and eight cylinder engines are typically employed in larger vehicles wherein larger load carrying capacity and higher performance are expected. Some of the existing vehicle designs have suffered from low fuel efficiency due to the fact that the internal combustion engine for the vehicle has to be designed with a sufficient capacity to meet the high torque demands that are only occasionally required.

The dual displacement engine of the present invention overcomes these deficiencies by providing a powertrain system that includes a dual engine system with one of the engine portions being independently operable for providing driving torque to a transmission while the second engine portion can be utilized to supplement the driving torque of the first engine portion to meet higher torque demand requirements. Operation of the dual engine system is provided such that during normal driving at constant speeds and typical driving loads, the first engine portion is utilized for providing driving torque to the wheels of the vehicle. During periods of operation where increased levels of torque are required, such as during acceleration, pulling a heavy load, or climbing a hill, the second engine portion is operated in conjunction with the first engine portion for meeting the higher torque demand requirements. A coupling arrangement is provided for connecting the first and second crankshafts for starting the second engine portion and also for engaging the first and second crankshafts together in phase with one another.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
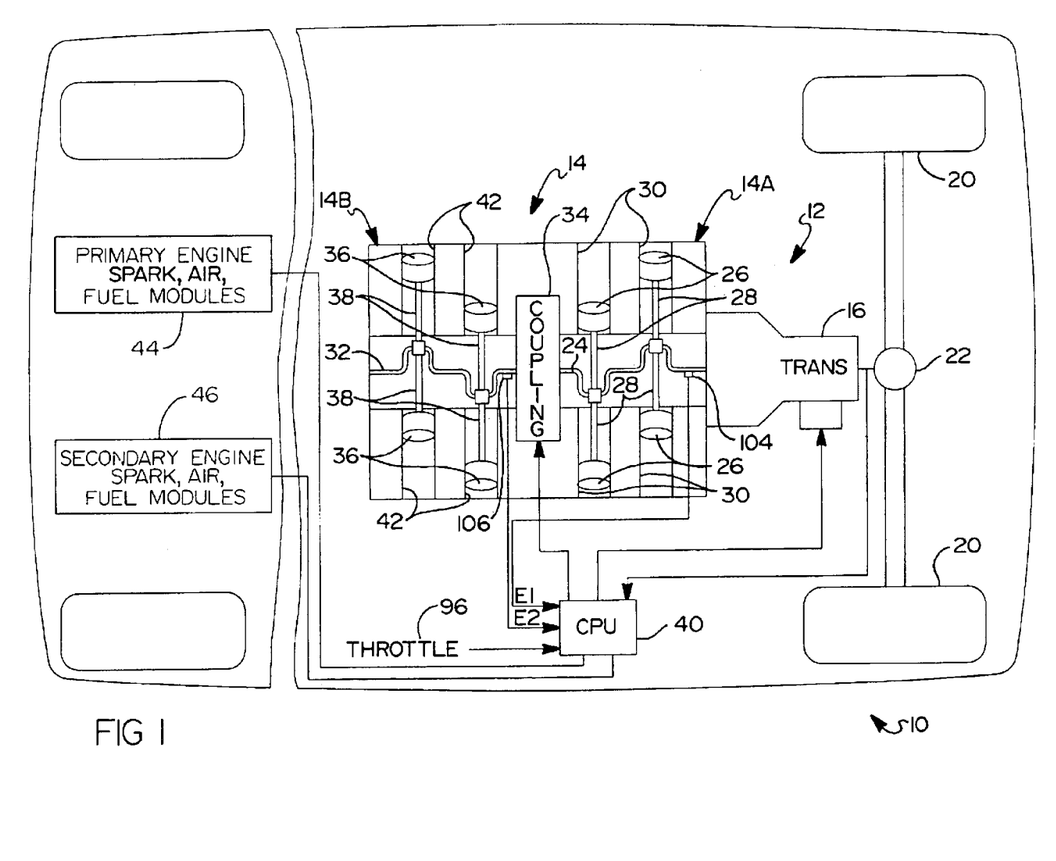
FIG. 1 is a schematic view of a vehicle powertrain system incorporating a dual engine crankshaft coupling arrangement according to the principles of the present invention.

With reference to FIG. 1, a vehicle 10 is shown provided with a powertrain system 12 including a dual displacement engine 14 (which will be described in greater detail herein) connected to a transmission 16 in a vehicle that may or may not use hybrid technology. A pair of drive wheels 20 are drivingly connected to the transmission 16 via a differential 22.

The dual displacement engine 14 includes a primary engine portion 14A including a primary or first crankshaft portion 24 having a plurality of pistons 26 connected thereto by corresponding connecting rods 28. Each of the pistons 26 are disposed in a corresponding cylinder 30 as is well known in the engine art. For purposes of illustration, four pistons 26 are mounted to the first crankshaft portion 24, although it should be understood that more or fewer pistons can be connected to the first crankshaft portion 24 without departing from the spirit and scope of the present invention.

A secondary engine portion 14B including a second crankshaft portion 32 is selectively coupled to the first crankshaft portion 24 by a coupling device 34. A plurality of pistons 36 are connected to the second crankshaft portion 32 by corresponding connecting rods 38. Each of the pistons 36 are disposed in a corresponding cylinder 42 as is well known in the engine art.

A central processor unit 40 is provided for controlling the transmission 16, the primary and secondary engine fuel, air, and spark modules 44, 46, as well as controlling the coupling device 34.

Figure 2:
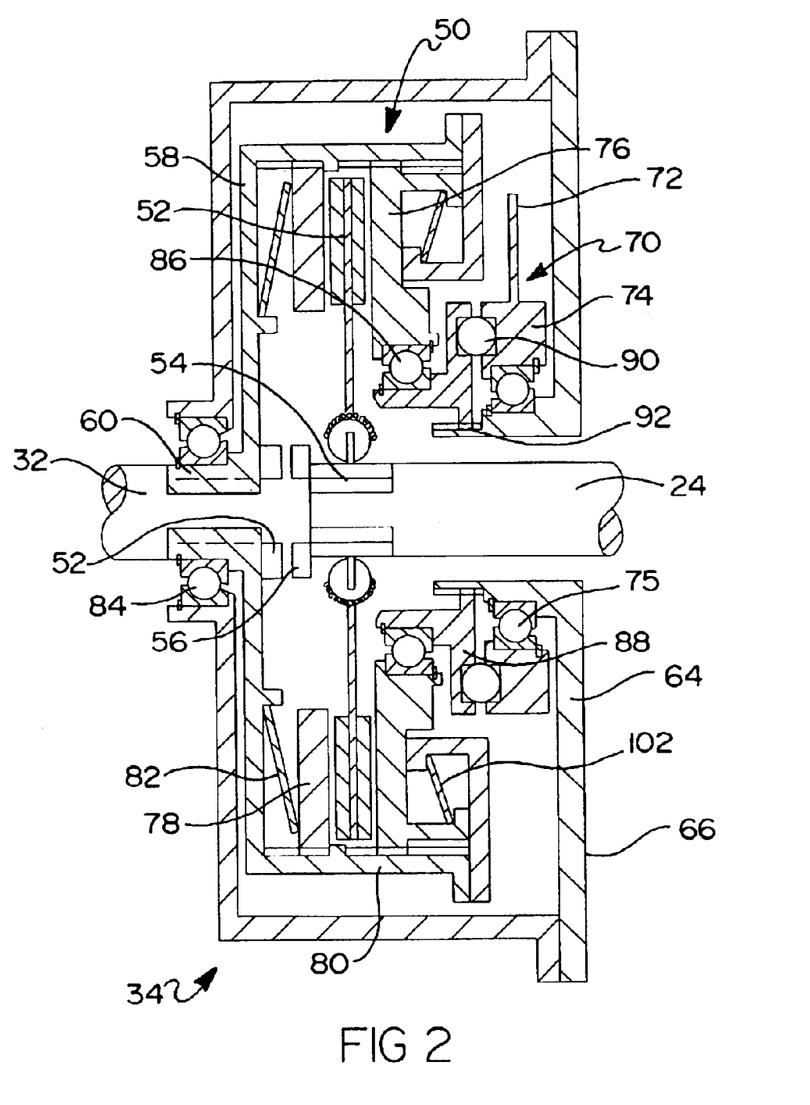
FIG. 2 is a cross-sectional view of a coupling device for coupling a first and second crankshaft of a dual engine system according to the principles of the present invention.

A first embodiment of the coupling device, according to the principles of the present invention, is shown in FIG. 2. The coupling device 34 couples the two engine crankshafts 24, 32 in series such that a primary engine, connected directly to a transmission can be used to propel a vehicle for a majority of its operating time, and a second engine crankshaft can be coupled to the first engine when additional power is needed for rapid accelerations or high load operating conditions.

As shown in FIG. 2, the primary engine crankshaft 24 is connected to a starter clutch assembly 50 that is engageable to provide driving torque from the primary engine crankshaft 24 to the secondary engine crankshaft 32. The starter clutch assembly 50 includes a clutch disc 52 connected to the primary engine crankshaft 24 by an angular specific spline 54 on the crankshaft 24. The clutch disc 52 is also connected to an angular specific dog clutch 56 which is slidable along the splined portion 54 of the primary crankshaft 24. The secondary engine crankshaft 32 is connected to a clutch plate carrier 58 by an angular-specific spline 60. An angular specific dog clutch 62 is connected to the clutch plate carrier 58 for mating engagement with the dog clutch 56 of the primary crankshaft 24. The dog clutch portions 56, 62 of the primary and secondary crankshafts 24, 32, respectively, serve as a phase clutch mechanism for matingly engaging the primary and second crankshaft 24, 32 at a predetermined phase angle relative to one another. Specifically, the angular specific dog clutch sides 56, 62 and the angular specific splines 54, 60 attaching the dog clutch 56 to the primary crankshaft 24 and the dog clutch 62 to the secondary crankshaft 32 are designed such that when the dog clutch portions 56, 62 are engaged, the secondary engine crankshaft 32 will rotate at the same speed in a design specific secondary crankshaft phase angle relative to the primary engine crankshaft 24.

The coupling device 34 includes a housing 64 which includes a surface 66 which is attached rigidly to the cylinder block of the primary engine 14a by bolts or other fastening means (not shown). The starter clutch assembly 50 includes an actuator system 70 which, according to the first embodiment of the present invention, includes a clutch engagement lever 72 to cause a clutch engagement cam and ball ramp mechanism 74 to move a pressure plate 76 into frictional engagement with the clutch disc 52 and subsequently the clutch plate 78 to cause the clutch plate 78, the pressure plate 76 and the secondary engine crankshaft 32 to begin to rotate in the same direction as the clutch disc 52 that is driven by the primary engine crankshaft 24. Torque from the clutch disc 52 is imparted by the pressure plate 76 into the clutch plate carrier 58 by means of internal splines 80 which are engaged with corresponding external splines on the clutch plate 78 and pressure plate 76.

The rotation of the clutch plate carrier 58 and pressure plate 76 are guided in their rotation within the coupling housing 64 by pilot bearing 84 and clutch throw-out bearing 86, respectively. A receiving ring 88 of the clutch engagement cam and ball ramp assembly 74 is actuated by balls 90. The receiving ring 88 then acts upon the pressure plate 76 through clutch throw-out bearing 86. The receiving ring 88 is rotationally restrained by splines 92 on the coupler housing 64 in order to provide a reaction torque for the engagement cam and ball ramp assembly 74.

The angular specific dog clutch 56, 62 includes precision face splines, consisting of several teeth arranged radially on the face surfaces of the parts 56, 62 and have one tooth space missing on one of the parts 56, 62 and one extra tooth filling a space on the other part 56, 62 such that the clutch will only engage in one angular specific orientation desired for proper timing relationship coupling of the engine crankshafts 24, 32. Additionally, the face surfaces of the teeth are generated helices to assist in smooth engagement and disengagement as parts 56 and 62 are moved together and apart axially.

The non-running secondary engine 14B can be started, brought up to the speed of the running primary engine 14A, and the two engines 14A, 14B can be locked together at a desirable specific phase angle relationship as follows. When it is determined by the central processor unit 40 based on the driver's throttle pedal 96 position and movement that the non-running secondary engine 14B is needed to provide additional power to assist the primary engine 14A, clutch engagement lever 72 is rotated by an actuator mechanism (described in greater detail herein) to engage the starter clutch assembly 50 and start the secondary engine crankshaft 32 rotating. At a specific desirable speed threshold of the secondary engine crankshaft 32, the secondary engine 14A is provided fuel, air, and ignition control via the central processor unit 40 controlling the fuel, air, and ignition modules 46 so that the second engine 14B starts and begins to run. The clutch engagement lever 76 is then returned to its clutch disengaged position, allowing the secondary engine 14B to accelerate freely and rotate faster under its own power.

Since the two engine speeds are not matched, the dog clutch 56, 62 does not engage. When the clutch engagement lever 72 is returned to its clutch-disengaged position, cone spring 102 forces the pressure plate 76 into a disengaged position with respect to the clutch disc 52 and clutch plate 78, allowing free acceleration of the now running and accelerating secondary engine 14B. When the rotating speed of the secondary engine crankshaft 32 is nearly the same as the primary engine crankshaft 24, the clutch engagement lever 72 is again rotated to engage the pressure plate 76, the clutch disc 52 and the clutch plate 78. This engagement reduces the speed differential between the two crankshafts 24, 32 to a point where the dog clutch 56, 62 can engage and lock the secondary engine crankshaft 32 to the primary engine crankshaft 24. The phase-specific dog clutch 56, 62 engages at a design-specific phase angle such that the secondary engine 14B and the primary engine 14A are running at the same speed. The power is then delivered from the secondary engine crankshaft 32 to the primary engine crankshaft 24, and the engines 14A, 14B are firing alternately and evenly.

When the equal crankshaft speed and even engine firing are detected by crankshaft sensors 104, 106 on the two crankshafts 24, 32, respectively, the clutch engagement lever 72 is rotated farther to its over center and toggle-locked position. To turn off the secondary engine 14B, it is only necessary to disengage the pressure plate 76 by rotating the clutch engagement lever 72 to its clutch-disengaged position and turn off the ignition and fuel to the secondary engine 14B.

Alternative means of forcing the pressure plate 76 into engagement with the clutch disc 52 will be described herein. Furthermore, the method shown using clutch engagement lever 72 and engagement cam and ball ramp 74 can also be replaced with alternative mechanisms as will also be described herein. Furthermore, it should be noted that the angular specific dog clutch 56, 62 can be designed to lock the engine crankshafts 24, 32 at any of several desirable crankshaft angles depending on the number of cylinders of each engine portion 14A, 14B and the number of engines to be coupled.

Figure 3:
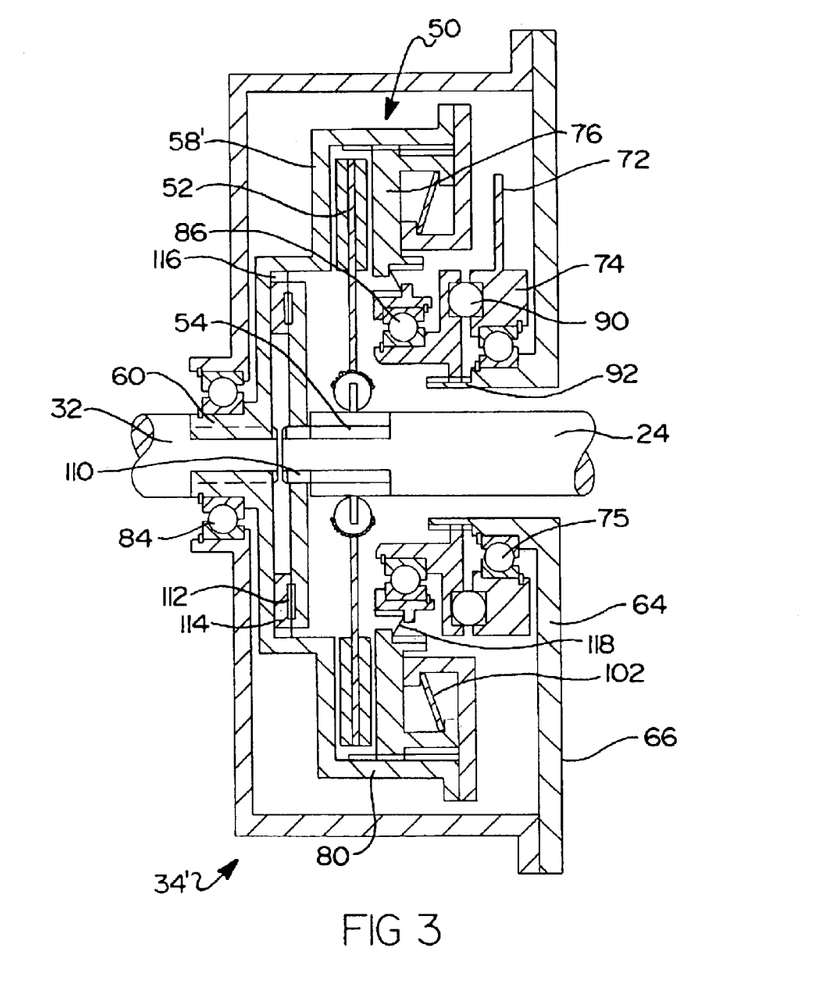
FIG. 3 is a cross-sectional view of a coupling device for a dual engine crankshaft system according to a second embodiment of the present invention.

With reference to FIG. 3 wherein common reference numerals are utilized to represent the same or similar elements, a second embodiment of a coupling device 34' which utilizes an overrunning clutch instead of a dog clutch will now be described. Since the structure and operation of the starter clutch 50 is the same as that described with reference to FIG. 2, the structure and operation thereof will now be described with regard to the embodiment shown in FIG. 3. The coupling device 34' is provided with a primary crankshaft 24 that includes an angular specific spline 110 which supports an angular specific overrunning clutch portion 112. The secondary engine crankshaft 32 is connected to a clutch plate/carrier 58' by an angular specific spline 60. An opposite side of the angular specific overrunning clutch 114 is connected to the clutch plate/carrier 58' by an angular specific spline 116. The angular specific overrunning clutch 112, 114 and its angular-specific spline connection 110, 116 to the primary engine crankshaft 24 and the clutch plate/ carrier 58', respectively, in combination with the angular-specific spline connection 60 of the clutch plate/carrier 58' to the secondary engine crankshaft 32 are designed such that the secondary engine crankshaft 32 cannot rotate faster than the primary engine crankshaft 24. Furthermore, the overrunning clutch 112, 114 will restrain the secondary engine crankshaft 32 to rotate at the same speed and at a design specific secondary crankshaft phase angle relative to the primary engine crankshaft 24.

The primary engine crankshaft 24 is free to operate without restraint since when the secondary engine crankshaft 32 is either stationary or rotating slower than the primary engine crankshaft 24, the overrunning clutch 112, 114 overruns and cannot transmit torque. If, while the primary engine 14A is propelling the vehicle, and the secondary engine 14B is not running, a powertrain computer 40 determines from the driver's accelerator pedal position and movement that additional power is needed from the secondary engine 14B, then an actuator (described in detail herein) originally attached to the coupling housing 64 rotates the clutch engagement lever 72 to cause the clutch engagement cam and ball ramp 74 to move the pressure plate 76 into frictional engagement with the clutch disc 52. Subsequently, the clutch plate/carrier 58', the pressure plate 76 and the secondary engine crankshaft 32 begin to rotate in the same direction as the clutch disc 52 that is driven by the primary engine crankshaft 24. Torque from the clutch disk 52 is imparted to the pressure plate 76 and clutch plate/carrier 58' by means of splines 80 in the same manner as described with reference to FIG. 2.

When the secondary engine crankshaft 32 achieves a rotating speed, which is the same as the primary engine crankshaft 24, the angular-specific overrunning clutch 112, 114 locks the secondary engine crankshaft 32 to the primary engine crankshaft 24 at a design-specific phase angle such that the secondary engine 14B and the primary engine 14A are running at the same speed. Power is then delivered from the secondary engine crankshaft 32 to the primary engine crankshaft 24, and the engines 14A, 14B are firing alternatively and evenly as determined by the angular-specific overrunning clutch 112, 114 locking angles. When the equal crankshaft speeds and even engine firing is detected by crankshaft sensors 104, 106, the clutch engagement lever 72 is again rotated to its clutch engaged position, further locking the two crankshafts 24, 32 together to prevent the secondary engine crankshaft 32 from rotating slower than the primary engine crankshaft 24 and overrunning the angular-specific overrunning clutch 112, 114. Cone spring 118 serves to provide a small amount of over travel of the clutch engagement cam and ball ramp 74 with respect to the pressure plate 76 so that the engagement cam and ball ramp 74 can be moved beyond the position of clutch engagement to an over center position or toggle lock position so that the clutch will remain engaged without constant force being exerted on the clutch engagement lever 115. To turn off the secondary engine 14B, it is only necessary to disengage the pressure plate 76 by rotating the clutch engagement lever 72 to its clutch-disengaged position and turn off the ignition and fuel to the secondary engine.

Figure 4:
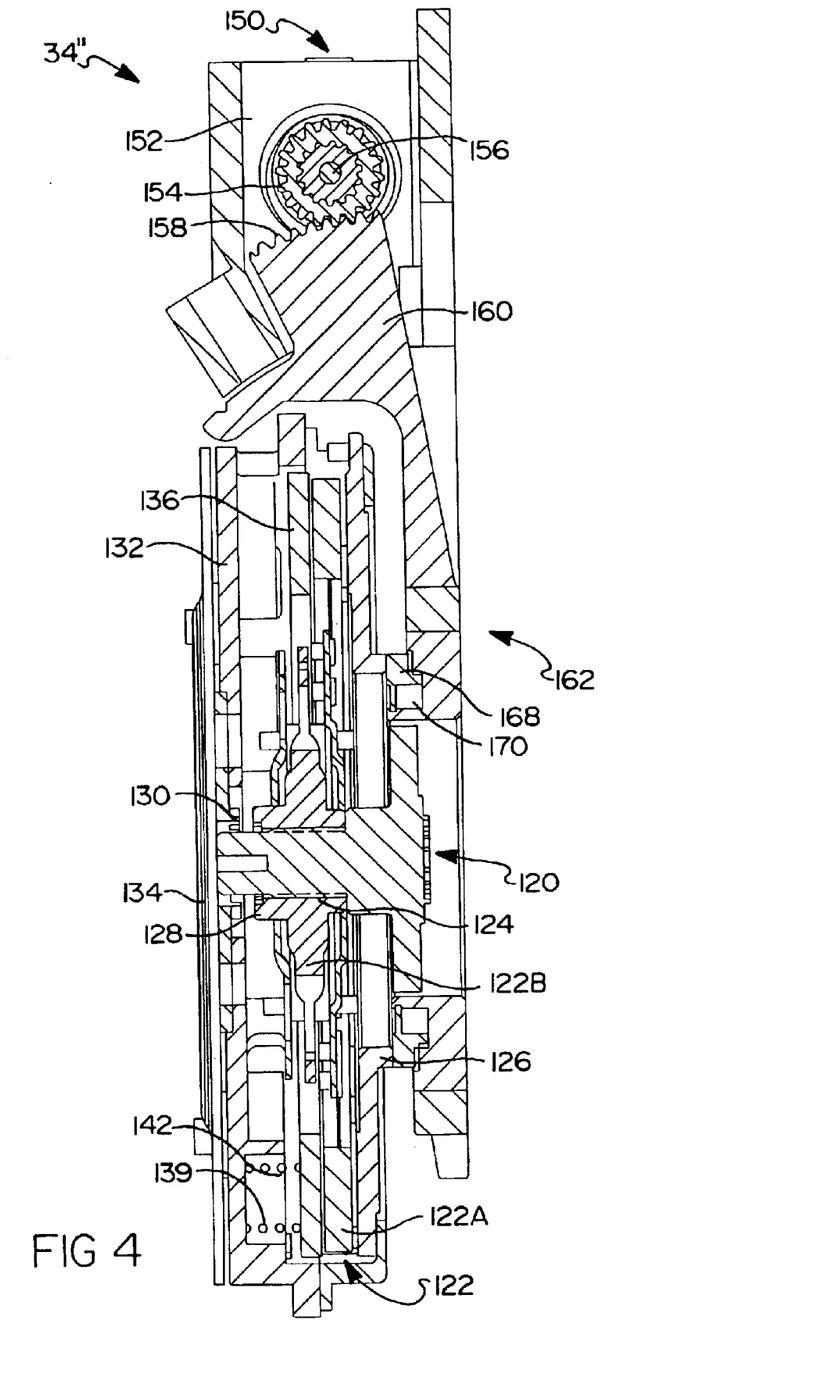
FIG. 4 is a cross-sectional view of a coupling device for a dual engine crankshaft system according to a third embodiment of the present invention.
Figure 6:
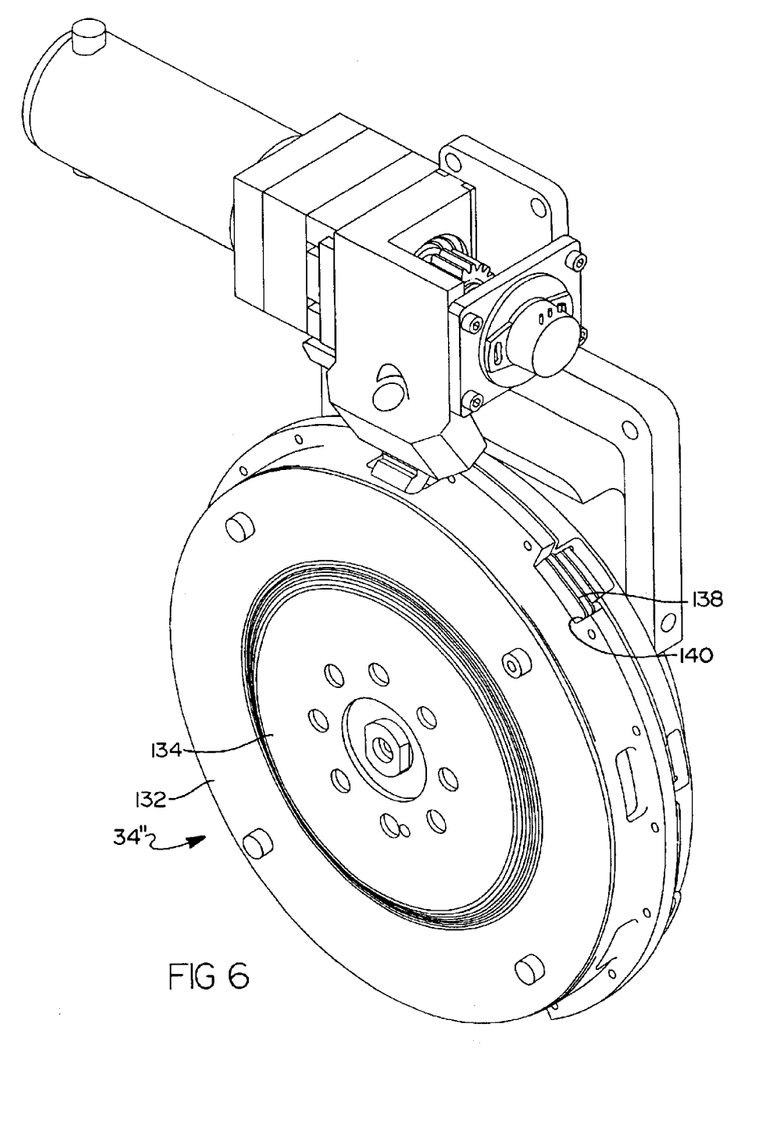
FIG. 6 is a front perspective view of the coupling device shown in FIG. 4.

FIG. 4 provides a detailed cross-sectional view of a coupling device, according to a third embodiment of the present invention. The coupling device 34" of FIG. 4 includes a hub 120 that is adapted to be mounted to the primary crankshaft 24. A clutch disc assembly 122 is mounted to the hub 120 by a spline connection 124. A pressure plate 126 is engageable with the clutch disc assembly 122. The clutch disc assembly 112 includes a dog clutch 128 on a face thereof that opposes a corresponding dog clutch portion 130 of a clutch plate carrier 132 which is adapted to be mounted to the secondary crankshaft 32 by a flex plate 134 which is provided with a plurality of holes for receiving fasteners for mounting the flex plate 134 to the second crankshaft 32. A pressure plate 136 is supported within the clutch plate carrier 132 for axial movement therein and includes radially extending fingers 138 which engage the clutch plate carrier 132 for driving rotation therewith. The radially extending fingers 138 of the pressure plate 136 are best shown in FIG. 6 wherein they are shown extending through an opening 140 in the clutch plate carrier 132. The pressure plate 136 is axially biased by springs 139 disposed in spring pockets 142 provided in the clutch plate carrier 132. The clutch plate assembly 122 is provided with damper springs as is known in the art provided between the friction disc portion 122A and hub portion 122B of the friction disc assembly 122.

Figure 5:
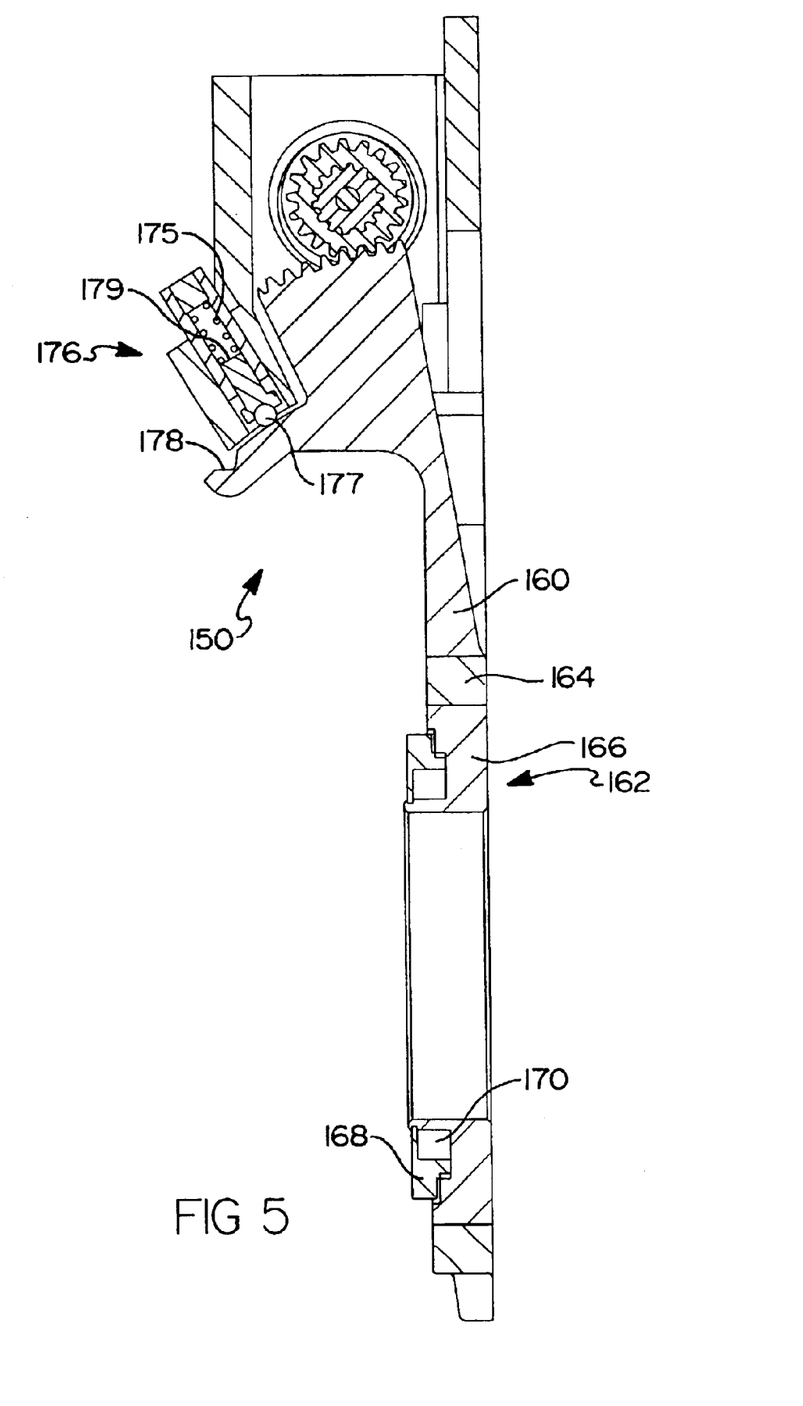
FIG. 5 is a cross-sectional view of the actuation mechanism for the coupling device shown in FIG. 4.
Figure 7:
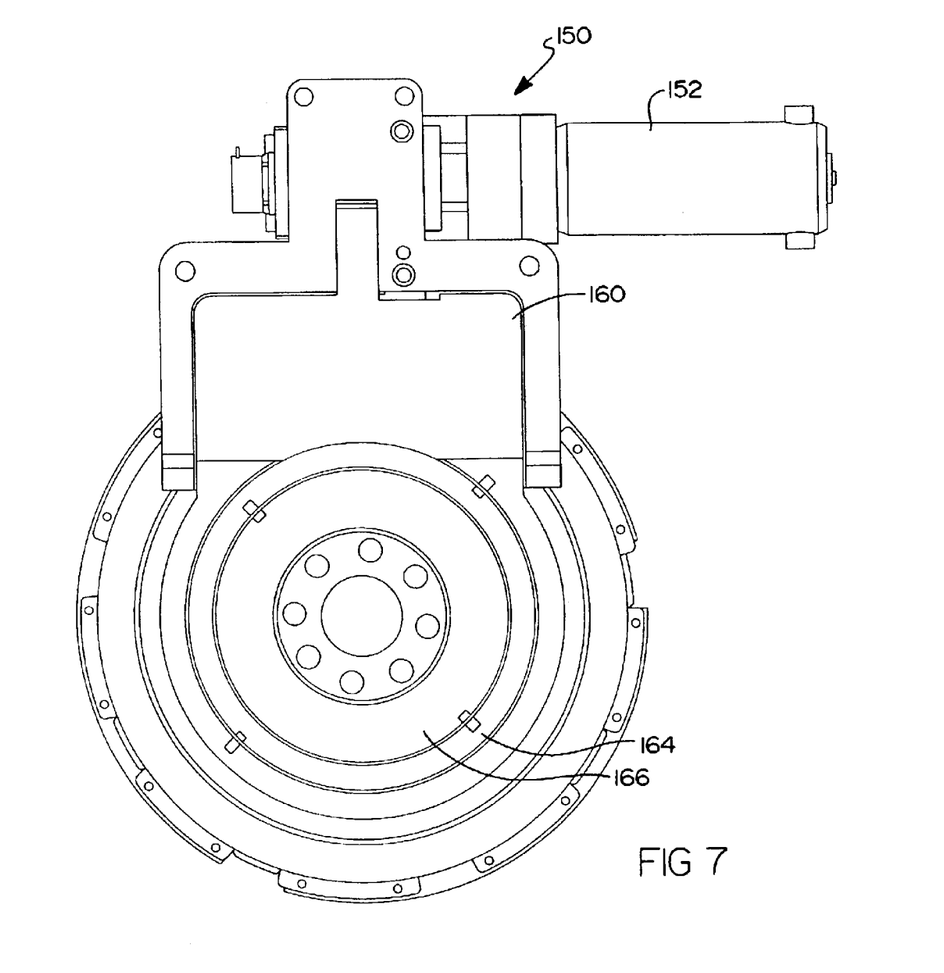
FIG. 7 is a rear view of the coupling device shown in FIG. 6.

A clutch actuator 150 is provided for engaging coupling device 34". The actuator device 150 includes a motor 152 that is connected to a gear 154 by a driveshaft 156. The gear 154 meshingly engages a gear segment 158 provided on an actuator lever 160. The actuator lever 160 is connected to a gimbal assembly 162 (best shown in FIGS. 5 and 7). The gimbal assembly 162 includes a large gimbal ring 164 and a small gimbal ring 166 which applies pressure to the pressure plate 126 via a bearing race 168 which is rotatably supported by a bearing 170. The gimbal assembly 162 allows pressure to be exerted by actuation of the actuating lever 160 by driving motor 152. The pinned connections between the actuator lever outer ring and the large gimbal ring 164, as well as the offset pivot pins 174 between the large gimbal ring 164 and the small gimbal ring 166, allow balanced pressure to be applied to the pressure plate 126. The actuator 150 is provided with a ball detent mechanism 176 including a spring biased ball 177 for engaging a detent 178 for maintaining the actuator lever 160 in an engaged position without requiring drive torque from the motor 152. The ball is biased by a spring 175 which presses against a plunger 179. Alternatively, the driving motor 152 can also be provided with a servo-brake for holding the output shaft 156 of the motor 152 in a predetermined position.

Figure 8:
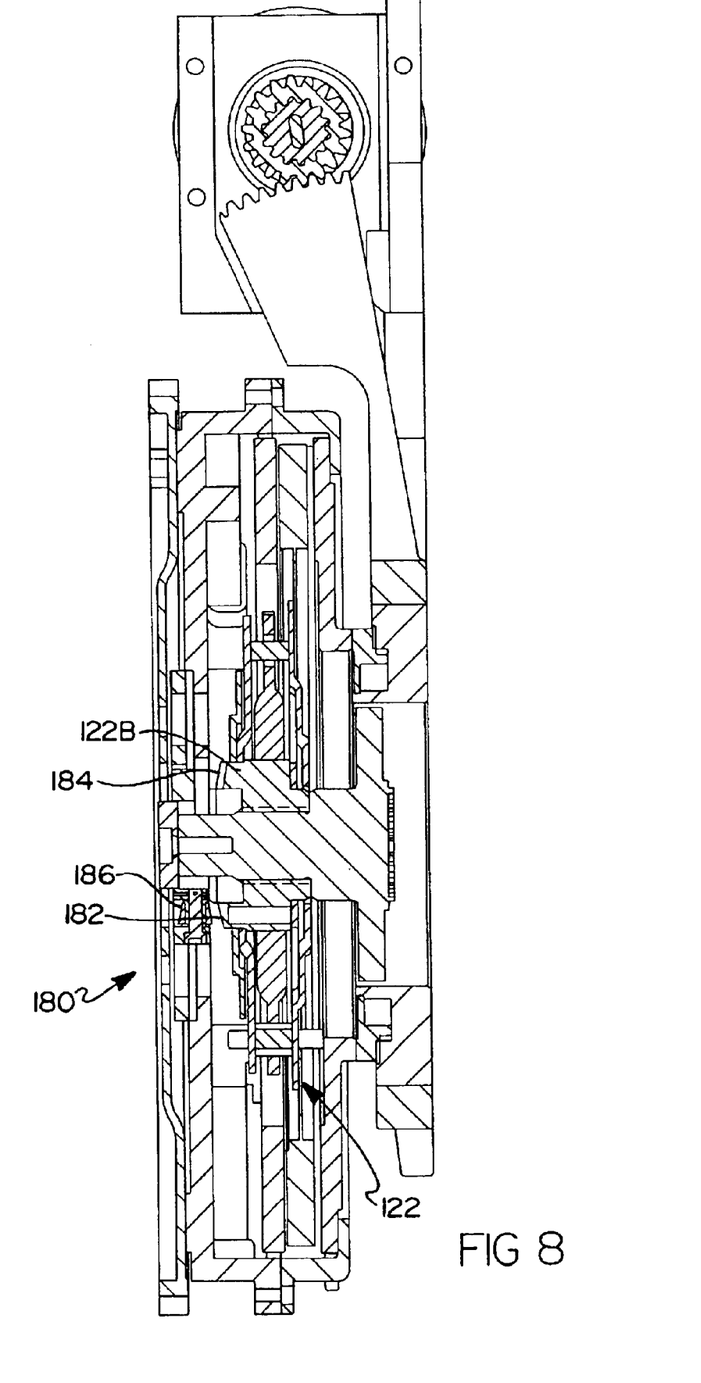
FIG. 8 is a cross-sectional view of a coupling device for a dual engine crankshaft system according to a fourth embodiment of the present invention.
Figure 9:
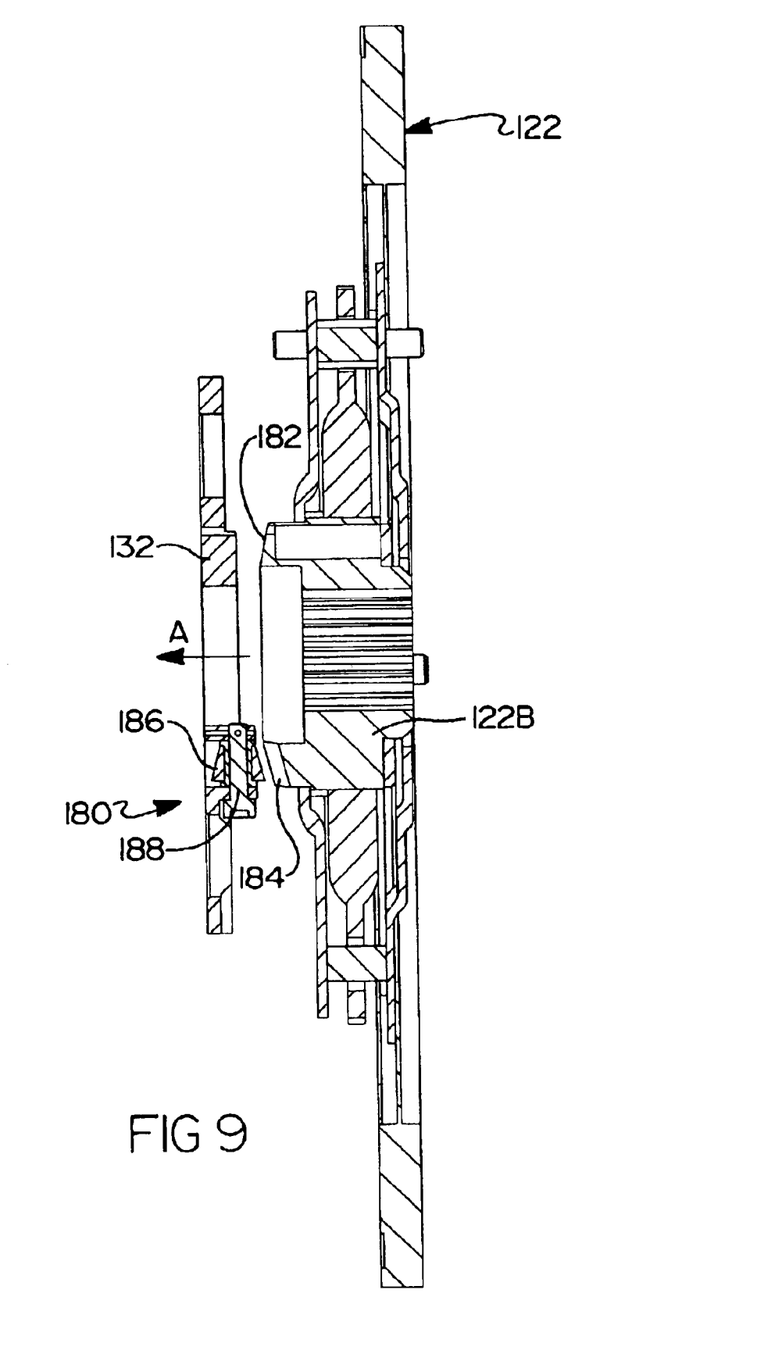
FIG. 9 is a detailed cross-sectional view of the phase clutch mechanism shown in FIG. 8.

With reference to FIGS. 8 and 9, a fourth embodiment of a coupling device, according to the principles of the present invention, will now be described.

With respect to the embodiment of FIGS. 8 and 9, the actuator mechanism 150 and starter clutch assembly are the same as described above with respect to the device of FIG. 4. However, the phase clutch portion includes a shuttle hub roller assembly 180. The shuttle hub roller assembly 180 includes a cone-shaped surface 182 disposed on a face of the hub portion 122B of the clutch disc assembly 122. A recessed roller groove 184 is provided in the cone-shaped surface 182. A cone shaped roller 186 is mounted to the clutch carrier 132 which is mounted to the second crankshaft 32. The roller 186 is rotatably supported on a support pin 188. When the clutch disc assembly 122 slides over (in the direction of arrow "A") to couple the secondary engine crankshaft 32 to the primary engine crankshaft 24, as described above, the clutch disc assembly 122 is spline indexed to the prime engine hub 120. Because the clutch disc 122 must be indexed to the second engine crankshaft 32 in order to synchronize the two engines 14A, 14B, the roller 186 rolls along the surface 182 of the hub 122B of the clutch disc assembly 122 until the relative rotation between the primary and secondary crankshafts 24, 32 is slow enough to allow the shuttle hub roller 186 to move until it drops into the roller groove 184, thus engaging the secondary crankshaft 32 in a preferred phase angle relationship relative to the primary crankshaft 24.

The description of the invention is merely exemplary in nature and, thus, variations that do not depart from the gist of the invention are intended to be within the scope of the invention. For example, although the preferred embodiment is illustrated with a piston engine, it should be understood that a rotary engine could also be utilized. Likewise, although the system utilizes an electro-mechanical actuator, other known actuator mechanisms such as pneumatic, hydraulic, or magnetic actuators may be utilized. Finally, although the system is disclosed utilizing a dry clutch system, a wet clutch or electromagnetic clutch system may also be utilized. Such variations are not to be regarded as a departure from the spirit and scope of the invention.

What is claimed is:

1. A coupling device for connecting a first and a second crankshaft each having a plurality of pistons drivingly connected thereto, said coupling device comprising:

a first clutch member drivingly attached to the first crankshaft;

a second clutch member attached to the second crankshaft;

an actuation mechanism movable between a first position for frictionally engaging said first clutch member with said second clutch member and a second position for disengaging said first clutch member from said second clutch member; and a phase clutch mechanism including a first clutch portion mounted to the first crankshaft and a second clutch portion mounted to the second crankshaft, said first and second clutch portions being engageable only when said second crankshaft is at a predetermined phase angle relative to said first crankshaft, wherein one of said first and second clutch portions of said phase clutch device includes a hub portion with a recessed roller groove in a surface thereof and the other of said first and second clutch portions of said phase clutch device includes a roller engageable with said hub portion for locking receipt in said recessed roller groove when said first and second crankshafts are at a predetermined phase angle position relative to one another.

2. The coupling device of claim 1, wherein said actuation mechanism includes a gimbal assembly for applying a force against a pressure plate which acts against said first clutch member.

3. The coupling device of claim 1, wherein said actuation mechanism includes a drive motor for driving a gear member, said gear member drivingly engaging a gear segment of an actuation lever.

4. The coupling device of claim 3, wherein said drive motor includes a servo brake for holding an output shaft of said drive motor in a predetermined position.

5. The coupling device of claim 3, wherein said actuation mechanism includes a detent mechanism for engaging said actuation lever in an engaged position.

6. A coupling device for connecting a first and a second crankshaft each having a plurality of pistons drivingly connected thereto, said coupling device comprising:

a first clutch member drivingly attached to the first crankshaft;

a second clutch member attached to the second crankshaft;

an actuation mechanism movable between a first position for frictionally engaging said first clutch member with said second clutch member and a second position for disengaging said first clutch member from said second clutch member; and a phase clutch mechanism including a first clutch portion mounted to the first crankshaft and a second clutch portion mounted to the second crankshaft, said first and second clutch portions being engageable only when said second crankshaft is at a predetermined phase angle relative to said first crankshaft, wherein said phase clutch device includes an overrunning clutch for permitting the first crankshaft to rotate relative to the second crankshaft.

7. The coupling device of claim 6, wherein said actuation mechanism includes a gimbal assembly for applying a force against a pressure plate which acts against said first clutch member.

8. The coupling device of claim 6, wherein said actuation mechanism includes a drive motor for driving a gear member, said gear member drivingly engaging a gear segment of an actuation lever.

9. The coupling device of claim 8, wherein said drive motor includes a servo brake for holding an output shaft of said drive motor in a predetermined position.

10. The coupling device of claim 8, wherein said actuation mechanism includes a detent mechanism for engaging said actuation lever in an engaged position.

11. A power unit for a vehicle, comprising:

a first engine portion including a first crankshaft having a plurality of pistons drivingly connected thereto;

a second engine portion including a second crankshaft having a plurality of pistons drivingly connected thereto;

a starter clutch mechanism operable to engage said first and said second crankshafts to drive said second crankshaft to start said second engine portion, said starter clutch mechanism including an actuator mechanism for actuating said starter clutch mechanism;

an engine control unit for monitoring operating conditions of the vehicle for determining a required engine torque output wherein when said required engine torque output exceeds a predetermined level said engine control unit provides a signal to said actuator mechanism to actuate said starter clutch mechanism to start said second engine portion, and wherein said engine control unit controls operation of said second engine portion to synchronize a speed of said second engine portion with said first engine portion; and a phase clutch mechanism for connecting said first and said second crankshafts, said phase clutch mechanism including a first clutch portion mounted to said first crankshaft and a second clutch portion mounted to said second crankshaft, said first and second clutch portions being engageable only when said second crankshaft is at a predetermined phase angle relative to said first crankshaft, wherein one of said first and second clutch portions of said phase clutch device includes a hub portion with a recessed roller groove in a surface thereof and the other of said first and second clutch portions of said phase clutch device includes a roller engageable with said hub portion for locking receipt in said recessed roller groove when said first and second crankshafts are at a predetermined phase angle position relative to one another.

12. A power unit for a vehicle, comprising:

a first engine portion including a first crankshaft having a plurality of pistons drivingly connected thereto;

a second engine portion including a second crankshaft having a plurality of pistons drivingly connected thereto;

a starter clutch mechanism operable to engage said first and said second crankshafts to drive said second crankshaft to start said second engine portion, said starter clutch mechanism including an actuator mechanism for actuating said starter clutch mechanism;

an engine control unit for monitoring operating conditions of the vehicle for determining a required engine torque output wherein when said required engine torque output exceeds a predetermined level, said engine control unit provides a signal to said actuator mechanism to actuate said starter clutch mechanism to start said second engine portion, and wherein said engine control unit controls operation of said second engine portion to synchronize a speed of said second engine portion with said first engine portion; and a phase clutch mechanism for connecting said first and said second crankshafts, said phase clutch mechanism including a first clutch portion mounted to said first crankshaft and a second clutch portion mounted to said second crankshaft, said first and second clutch portions being engageable only when said second crankshaft is at a predetermined phase angle relative to said first crankshaft, wherein said phase clutch device includes an overrunning clutch for permitting said first crankshaft to rotate relative to said second crankshaft.

* * * * *